July 13, 1943.　　F. W. COFFING　　2,324,064
GANG DISK IMPLEMENT
Filed July 10, 1941
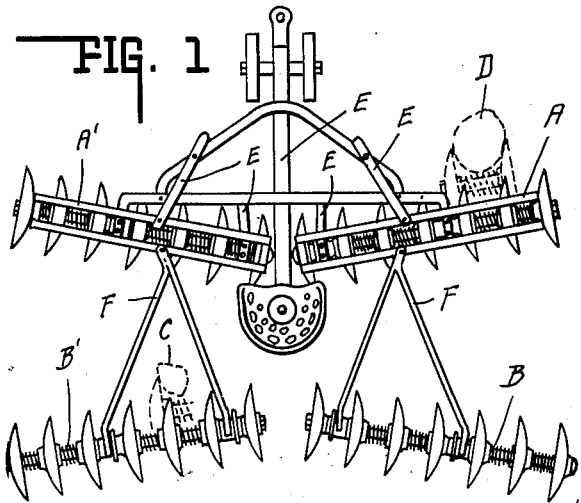
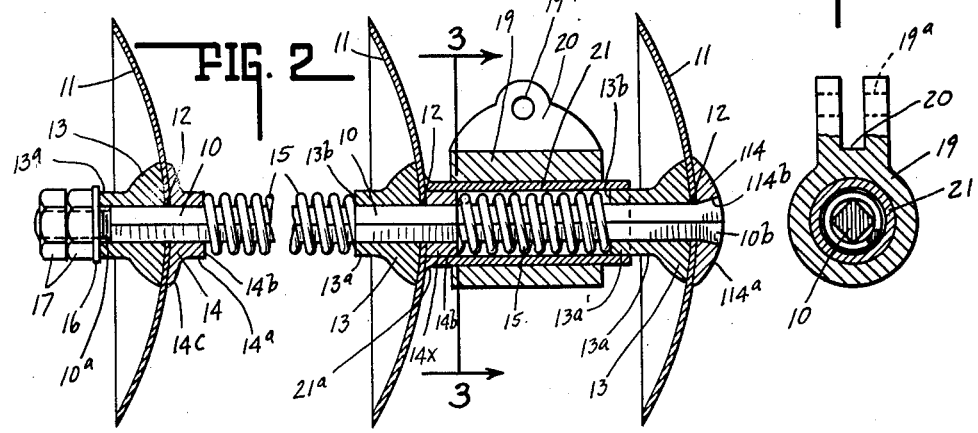
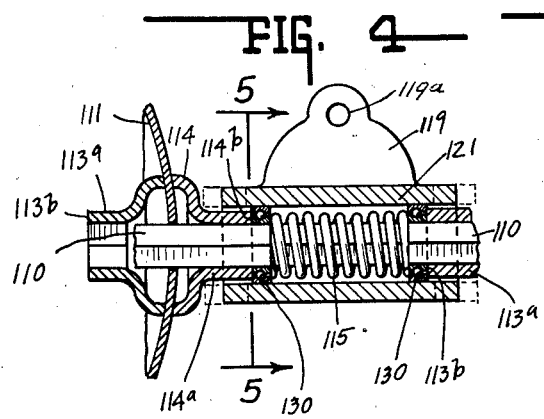 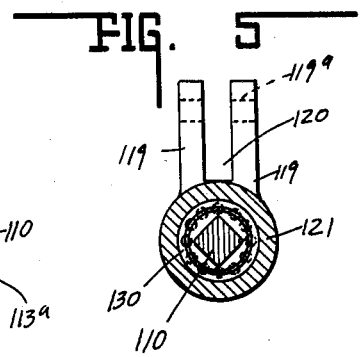
INVENTOR.
FREDRICK W. COFFING.
BY Lockwood, Goldsmith & Galt,
ATTORNEYS.

Patented July 13, 1943

2,324,064

UNITED STATES PATENT OFFICE 2,324,064

GANG DISK IMPLEMENT

Fredrick W. Coffing, Danville, Ill.

Application July 10, 1941, Serial No. 401,818

7 Claims. (Cl. 97—220)

This invention relates to a farm disk implement and more particularly to the mounting of disks in multiple.

The chief object of the present invention is to mount disks of a farm disk implement such that upon disk engagement with a minor obstruction, the obstruction engaging disk can automatically shift its position to clear same, or if an obstruction be encountered that normally would wedge between adjacent disks, same shift relative to each so that the obstruction can freely pass between the adjacent disks.

This invention is particularly useful in preparing rocky or newly cleared ground. A farm disk implement whether team or tractor drawn, may be readily guided to avoid exposed large boulders or stumps visible to the driver. The embedded boulders or smaller stumps, not visible, in soil preparation, are encountered by the disks and same are bent or broken, or the obstruction becomes wedged between adjacent disks which result in disk damage and/or requires considerable time and effort to release the implement from such obstruction.

It has been proven that by having each disk individually cushioned, that when one disk blade strikes an obstacle, it does not have to lift the entire gang of disks to pass this one obstruction, therefore making the pulling power much less and making a more even and uniform job of disking. Another point which has been proven by the pneumatic tire on the tractor, where the cushion was installed, that all equipment fastened to the tractor has been much longer lifed. Therefore, I claim that by having the springs in the disk this will prolong the life of the disk.

The present invention permits the disking of rocky or newly cleared ground in approximately one-fourth the usual time heretofore required to disk such ground with standard or conventional farm disk implements, and more particularly without any damage whatsoever to the disks.

The chief feature of the present invention resides in yieldingly mounting the several disks constituting the single gang thereof.

Other objects and features of the invention will be set forth more fully hereinafter.

The full nature of the invention will be understood from the accompanying drawing and the following description and claims.

In the drawing,

Fig. 1 is a diagrammatic top plan view of a multiple gang disk implement illustrating one gang engaged with a wedging obstruction and another gang simultaneously engaging a singular obstruction, dotted lines indicating disk accommodation positions assumed for freeing the implement from these obstructions.

Fig. 2 is an enlarged central sectional view of a drawbar connection and a plurality of yieldingly mounted disks of a single gang, both ends of the gang being illustrated.

Fig. 3 is a transverse sectional view taken on line 3—3 of Fig. 2 and in the direction of the arrows.

Fig. 4 is an enlarged central sectional view of a modified form of drawbar connection.

Fig. 5 is a transverse sectional view taken on line 5—5 of Fig. 4 and in the direction of the arrows.

In Fig. 1 of the drawing, there is illustrated four gangs of a disk harrow, one group, the foremost constituting gangs A and A' and the other and rearmost constituting gangs B and B'. Gangs A and A' have their adjacent ends, directed rearwardly, relative to the direction of general movement, from their forward ends. Gangs B and B' have their adjacent ends forward of their remote ends.

The disks of each cooperating pair of gangs are reversely positioned relative to those of the other gangs and diagonally opposite gangs have their disks similarly positioned. As shown in Fig. 1, the disks of gangs A and A' are oppositely positioned and work the dirt outwardly from the central line of travel while the oppositely positioned disks in gangs B and B' work the dirt toward said central line.

All of the foregoing is conventional structure. In Fig. 1, D indicates an obstruction wedged between two disks. The dotted lines indicate the pressure shifted positions of the wedge contact disks for automatically freeing the disks from the obstruction.

In Fig. 1, C indicates a singular obstruction encountered by a disk. The dotted lines adjacent thereto indicate the disk position after obstruction engagement whereby the unit can advance. Upon the pressure shifted disk returning to original position when free of the obstruction, dirt has been known to fly in the return direction of the disc, for more than twenty feet.

Reference will again be had momentarily to Fig. 1 and therein E indicates the several forward gang drawbar connections for team or tractor travel. F indicates connections to the rearward gangs. Since, as stated, Fig. 1 is merely diagrammatic, other portions of the agricultural implement of this general character are omitted, except the seat.

Reference now will be had to Figs. 2 and 3, wherein the simplest form of the invention is illustrated. Herein 10 indicates a non-circular shaft or rod. Upon the same are mounted in spaced relation the several slightly cupped or cup-shaped ground engaging disks 11. These are coaxially mounted on shaft 10 anad may have their central apertures 12 conform in outline to that of the shaft.

Upon opposite sides of the disk and mounted upon shaft 10 are the convex and concave support members 13 and 14, respectively. The curvature of the confronting surfaces of these members corresponds to that of the disk 11 interposed therebetween. Each of these disks sustaining members is slidably mounted on the shaft. Each has a cylindrical shaped exterior designated by subscript "a."

Concentric with the shaft axis and bearing on the end faces b of members 13 and 14, are the comparatively heavy coil springs 15. These springs normally retain all the disks in the predetermined spaced relation.

The end member 114 has a rounded face 114a instead of the collar portion and same is counterbored as at 114b.

The opposite end member 13 is retained by lock washer 16 and lock nuts 17, the latter being threaded on shaft 10 at 10a. The other end of the shaft is enlarged at 10b to fit into counterbore 114b. The foregoing construction permits the force of the compression springs 15 to be adjusted, as well as retains all members in assembled relation on shaft 10 for rotation as a unit.

The drawbar is connected to yoke 19 split at 20 and substantially encircling a sleeve 21 which may be flanged at 21a similar to flange 14c. In this instance, the sleeve encircles member 14x which may be welded thereto or the adjacent disk so that sleeve 21 rotates with the shaft 10, since each member 13—14 is squared to seat squared shaft 10. Sleeve 21 telescopes the adjacent collar 13a' of the adjacent spaced member 13. This is of greater axial length than the collars 13a. The drawbar yoke 19 swivels on sleeve 21 and the drawbar proper may pivot at 19a on an axis transverse to that of the sleeve 21.

Referring to Figs. 4 and 5, it will be noted the sleeve and yoke 121—119 may be combined and the same swivel upon anti-friction means 130 about the shaft axis and slide axially relative thereto as well. This unit includes ears 119 apertured at 119a and forming groove or split 120 for member E mounting, see Fig. 1. The disk is indicated by 111.

Hence, the sleeve 121 need not be rigid with the collar portion 114a or 113a of a disk supporting member but may rotate relative thereto and the anti-friction bearings 130 may be carried by the shaft 110 between adjacent collar portions 113a and 114a and bear upon adjacent faces 113b and 114b thereof, and the spring 115 ends so that the sleeve 121 may rotate and slide, see dotted lines Fig. 4, as required.

Various other modifications may be utilized as desired or preferred.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A multi-disk type agricultural implement including a disk supporting shaft, a plurality of disks thereon, means at opposite sides of each disk and supporting same substantially parallel to the other disks, said means of adjacent disks adjacent each other being spaced apart, and slidable on the shaft, yielding means between each pair of spaced means for normally maintaining each intermediate disk in predetermined relation to the other disks but permitting forcible movement of a disk axially of the shaft when required, one of the means including an elongated collar portion, an elongated sleeve encircling same and telescopically associated therewith and positioned between adjacent disks, and a traction yoke pivotally associated with said sleeve.

2. A multi-disk type agricultural implement including a disk supporting shaft, a plurality of disks thereon, means at opposite sides of each disk and supporting same substantially parallel to the other disks, said means of adjacent disks adjacent each other being spaced apart, and slidable on the shaft, yielding means between each pair of spaced means for normally maintaining each intermediate disk in predetermined relation to the other disks but permitting forcible movement of a disk axially of the shaft when required, one of the means including an elongated collar portion, an elongated sleeve encircling same and telescopically associated therewith and positioned between adjacent disks, a traction yoke associated with said sleeve, and anti-friction means between the shaft and sleeve.

3. A multi-disk type agricultural implement including a disk supporting shaft, a plurality of disks thereon, means at opposite sides of each disk and supporting same substantially parallel to the other disks, said means of adjacent disks adjacent each other being spaced apart, and slidable on the shaft, yielding means between each pair of spaced means for normally maintaining each intermediate disk in predetermined relation to the other disks but permitting forcible movement of a disk axially of the shaft when required, two adjacent spaced means including elongated cylindrical collar portions, an anti-friction means carried by the shaft and interposed between each adjacent face of the collar portion and the adjacent end of the yielding means, and an elongated sleeve for draw-bar connection slidable axially of and rotative about the collar portions and coaxially supported by said anti-friction means.

4. A multi-disk type agricultural implement including a disk supporting shaft, a plurality of disks, each disk being apertured with the shaft extending therethrough, a singular means at each side of each disk adjacent said aperture, said singular means at opposite sides of each disk bearing directly thereon and at least slightly remote from the aperture for supporting said disk substantially parallel to the several other disks, adjacent singular means of adjacent disks being spaced apart and slidable on the shaft, the adjacent ends of said adjacent singular means being of closed character and closely embracing said shaft, and an elongated coil spring about the shaft and of a compressed length sufficient for disk spacing purposes and having its ends operatively engaging the said adjacent closed ends of said adjacent singular means, said coil spring normally maintaining each intermediate disk in predetermined relation to the other disks but permitting forcible movement of a disk and an immediately adjacent singular means and axially of the shaft when required, each spring constituting the major spacing element between adjacent disks.

5. A multi-disk type agricultural implement as defined by claim 4 wherein there is provided between two adjacent disks an elongated tubular, drawbar connecting, yoke member peripherally enveloping operatively the coiled spring and the adjacent ends of a pair of adjacent singular means and of sufficient length at least equal to the normal spacing between said ends and pivotal about the member longitudinal axis, same coinciding with that of the spring axis, said yoke member having a split formation offset laterally of the yoke member axis and apertured transversely thereof for drawbar connection.

6. A multi-disk type agricultural implement as defined by claim 4 wherein there is provided between two adjacent disks an elongated tubular, drawbar connecting, yoke member peripherally enveloping operatively the coiled spring and the adjacent ends of a pair of adjacent singular means and of sufficient length at least equal to the normal spacing between said ends and pivotal about the member longitudinal axis, same coinciding with that of the spring axis, said yoke member having a split formation offset laterally of the yoke member axis and apertured transversely thereof for drawbar connection, and anti-friction means interposed between the adjacent ends of adjacent members and the ends of the included coil spring therebetween and rotatably supporting said tubular yoke member.

7. A multi-disk type agricultural implement as defined by claim 4 wherein there is provided between two adjacent disks an elongated tubular, drawbar connecting, yoke member peripherally enveloping operatively the coiled spring and the adjacent ends of a pair of adjacent singular means and of sufficient length at least equal to the normal spacing between said ends and pivotal about the member longitudinal axis, same coinciding with that of the spring axis, said yoke member having a split formation offset laterally of the yoke member axis and apertured transversely thereof for drawbar connection, and an elongated sleeve member within the tubular yoke member and of a length greater than that of said yoke member and less than the normal spacing distance between adjacent disks and upon which the yoke member pivots.

FREDRICK W. COFFING.